C. G. TUFTS.
PROCESS OF OBTAINING PURIFIED AMMONIA FROM COAL GAS.
APPLICATION FILED MAY 18, 1911.
1,065,566.
Patented June 24, 1913.
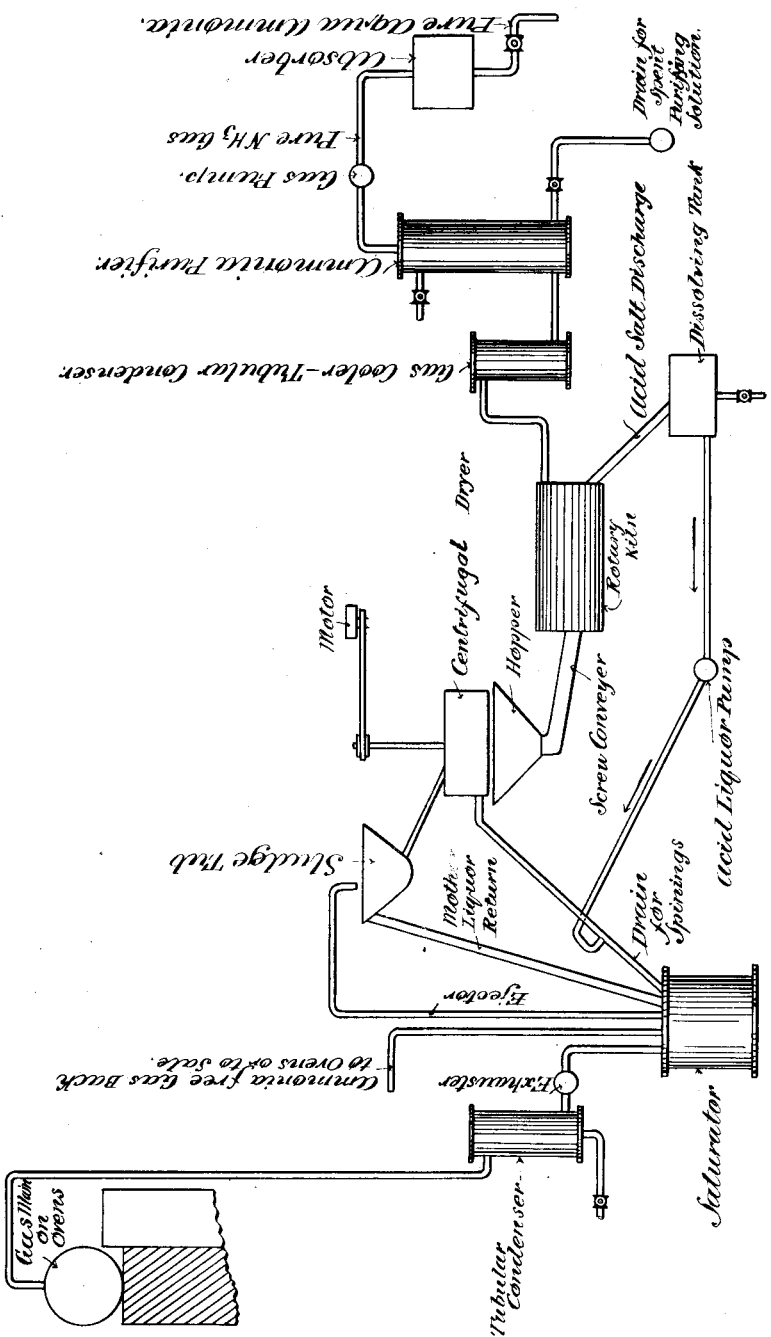

UNITED STATES PATENT OFFICE.

CHARLES G. TUFTS, OF SYRACUSE, NEW YORK, ASSIGNOR TO SEMET-SOLVAY COMPANY, OF SOLVAY, NEW YORK, A CORPORATION OF PENNSYLVANIA.

PROCESS OF OBTAINING PURIFIED AMMONIA FROM COAL-GAS.

1,065,566.

Specification of Letters Patent.

Patented June 24, 1913.

Application filed May 16, 1911. Serial No. 628,060.

*To all whom it may concern:*

Be it known that I, CHARLES G. TUFTS, a citizen of the United States, residing at Syracuse, in the county of Onondaga and State of New York, have invented a new and Improved Process of Obtaining Purified Ammonia from Coal-Gas, of which the following is a specification.

My invention relates particularly to the purification of ammonia as it is obtained in the destructive distillation of coal.

As is well known, ammonia derived from this source is as it comes from the oven or retort, associated with many impurities, such as tar and tarry compounds, pyridin and pyridin oils, alcohol compounds, nitriles, and many other volatile organic and inorganic compounds. Heretofore these have been separated from the ammonia by cooling and washing the gases of distillation, whereby in the first instance, so-called ammoniacal liquor is produced, which contains the ammonia and the impurities, and which is afterward treated in various, generally complex and tedious, ways to recover the ammonia freed from the impurities. My process, on the contrary, is directed to the direct treatment of the oven gases to the end of recovering purified ammonia without the preliminary steps of washing and forming ammoniacal liquor, with the result of great simplicity and economy both in manipulation and in the apparatus required.

In the accompanying drawing I have indicated diagrammatically a conventional form of apparatus which may be employed in carrying my invention into effect, each of the separate parts of which is old and well known.

In carrying my process into effect I take the gases of distillation as they come from the oven main and, either with or without a preliminary scrubbing in tar to remove the tar carried in suspension in the gas (and, if desired, after such cooling as is possible without condensation of the water vapor, as by passing them through a tubular condenser) cause them to pass through a saturator containing sulfuric acid or acid sulfate of ammonia.

The ammonia compounds of the gas are broken up in the saturator, the ammonia combining with the acid to form ammonium sulfate. Among these are included the fixed ammonia compounds, such as ammonium chlorid, for the recovery of the ammonia content of which the lime treatment has heretofore been essential. The acid radicals of these pass off with the uncombined gases, the ammonia combining with the acid in the saturator. In this respect my process presents a material advantage, especially in the treatment of those gases in which a considerable proportion of the ammonia is present in the form of fixed salts, since the necessity of using lime to effect the decomposition of these is entirely obviated. The bulk of the gases of distillation, which may be designated as coal gas, passes off from the saturator and may be burned under boilers, or treated in any desired manner and stored for use. Certain other gases which are usually present in ammoniacal liquor, either uncombined or in the form of unstable compounds of ammonia, such as $CO_2$ and $H_2S$, and which constitute a large part of the bulk of the impurities from which the ammonia requires to be freed, are dissociated from the ammonia at this point and pass off with the coal gas. With the coal gas there will also pass off from the saturator certain of the light oils present, such as benzol, toluol and xylol, and, in case the tar has not been previously removed from the gas, a portion of the tar. The remainder of the tar will remain in the saturator mixed with the ammonium sulfate formed therein.

The ammonium sulfate formed is then removed from the saturator and dried as by being allowed to settle in a sludge tub and then passed through a centrifugal drier, the drainings in each case being returned to the saturator, and is then conducted to a kiln where it is brought as quickly as possible to a temperature sufficiently high to decompose the ammonium sulfate, care being taken to avoid the decomposition of ammonia. That is, the temperature should range from 350° C to not exceeding 400° C.

The nitrogenous organic and carbon compounds accompanying the ammonia as impurities, though some portion of these may be oxidized and remain in the kiln, are in the main volatilized and driven off with ammonia dissociated from the ammonium sulfate, which is converted into acid ammonium sulfate, with some pyro sulfate of ammonia, in case the temperature has been carried to near the higher limit permissible.

Such tar as has remained with the ammonium sulfate is either converted into pitch or charred and is removed from the kiln with the acid ammonium sulfate to a dissolving tank. The acid ammonium sulfate is dissolved to be subsequently returned to the saturator to be again used in the formation of ammonium sulfate. The pitch, tar and other accompanying impurities settle or float in the tank and are easily separated from the solution, as by decantation, filtration, or skimming.

The gases driven off from the kiln, i. e., the ammonia with the accompanying impurities, are then cooled, as by being passed through a tubular condenser, to such low point, say 20° to 25° C., as will facilitate the subsequent purification, and the final purification is then effected in any suitable manner, as by passing the mixed gases through a cold ammonia purifier, consisting of superposed pans forming a stack or wash column and containing a saturated solution of ammonia in water maintained at a low temperature by the circulation of a cooling liquid. The construction and operation of such a purifier is fully described in Letters Patent obtained by me, jointly with others, No. 1,012,272, Dec. 19, 1911, and need not be further described herein. In it the impurities accompanying the ammonia are absorbed and held by the saturated solution of ammonia while the pure ammonia gas passes, or is drawn, off to be absorbed in an absorber to form aqua ammonia, or to be treated as may be desired.

The advantages of my process will be obvious to these skilled in the art since it greatly simplifies the recovery of the ammonia in a pure state by dispensing with the washing of the gas to form ammoniacal liquor and the subsequent distillation of the liquor, together with the complicated and expensive apparatus incident thereto, and also entirely obviates the necessity of using lime to break up the fixed ammonia compounds.

What I claim as new and desire to secure by Letters Patent is:—

1. The hereinbefore described process of recovering purified ammonia from the gases obtained from the distillation of coal which consists in first treating the mixed gases as they come from the retort to separate the tar therefrom, then passing the gases through acid to form ammonium sulfate, drawing off the uncombined gases and leaving the ammonia with the remaining umpurities in the sulfate; heating the ammonium sulfate so as to drive off ammonia in company with the volatilizable impurities and finally separating the ammonia from the impurities.

2. The hereinbefore described process of recovering purified ammonia from the gases obtained from the distillation of coal which consists in treating the mixed gases as they come from the retort with acid so that the fixed ammonia compounds are broken up and ammonium sulfate is formed; drawing off the uncombined gases and leaving the ammonia together with the remaining impurities in the sulfate; rapidly raising the ammonium sulfate to such temperature as to volatilize ammonia and volatile impurities and drawing off the volatilized products together and finally separating the volatilized ammonia from the accompanying volatilized impurities.

3. The hereinbefore described improvement in the art of recovering purified ammonia from coal gas which consists in passing the gas as produced through acid to form ammonium sulfate, quickly heating the ammonium sulfate so as to drive off ammonia with accompanying impurities, and leave acid ammonium sulfate, forming a solution of the residual acid sulfate and recharging the solution with ammonia to form ammonium sulfate in the same manner as before to repeat the operation.

4. The hereinbefore described improvement in the art of recovering purified ammonia from coal gases which consists in passing the gas as produced through acid whereby ammonium sulfate is formed; heating the ammonium sulfate in such manner as to volatilize ammonia content together with the volatile impurities and to leave behind the tar in the shape of pitch and charred product, withdrawing the volatilized ammonia with the volatilized impurities and finally separating the ammonia from the impurities.

In testimony whereof, I have hereunto subscribed my name, this 9th day of May A. D., 1911.

CHARLES G. TUFTS.

Witnesses:
HERBERT N. COLE,
H. DUANE BRUCE.